US011017556B2

(12) United States Patent
Yang et al.

(10) Patent No.: US 11,017,556 B2
(45) Date of Patent: May 25, 2021

(54) ITERATIVE SPATIO-TEMPORAL ACTION DETECTION IN VIDEO

(71) Applicant: NVIDIA Corporation, Santa Clara, CA (US)

(72) Inventors: Xiaodong Yang, Fremont, CA (US); Xitong Yang, Greenbelt, MD (US); Fanyi Xiao, Davis, CA (US); Ming-Yu Liu, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 77 days.

(21) Appl. No.: 16/152,303

(22) Filed: Oct. 4, 2018

(65) Prior Publication Data
US 2019/0102908 A1 Apr. 4, 2019

Related U.S. Application Data

(60) Provisional application No. 62/568,285, filed on Oct. 4, 2017.

(51) Int. Cl.
*G06T 7/73* (2017.01)
*G06K 9/00* (2006.01)
*G06T 7/277* (2017.01)

(52) U.S. Cl.
CPC ............ *G06T 7/74* (2017.01); *G06K 9/00335* (2013.01); *G06T 7/277* (2017.01); *G06T 2207/10016* (2013.01); *G06T 2207/20016* (2013.01); *G06T 2207/20076* (2013.01); *G06T 2207/20084* (2013.01)

(58) Field of Classification Search
CPC ............ G06T 2207/20016; G06T 7/74; G06T 2207/20076; G06T 2207/20084; G06T 2207/10016; G06T 7/277; G06K 9/00335; G06K 9/3233; G06K 9/6267
See application file for complete search history.

(56) References Cited

U.S. PATENT DOCUMENTS

2018/0349704 A1* 12/2018 Mehrseresht ...... G06K 9/00335
2018/0374191 A1* 12/2018 Pit Rada .................. G06T 7/11
2019/0364290 A1* 11/2019 Qin .................... H04N 21/8456

OTHER PUBLICATIONS

Soomro et al., "UCF 101: A Dataset of 101 Human Actions Classes from Videos in The Wild.", CRCV-TR-12-01, Nov. 2012, pp. 1-7.
Idrees et al., The THUMOS Challenge on Action Recognition for Videos "in the Wild" *Computer Vision and Image Understanding* 115 (2017): 1-23.
Yang et al., "Spatio-Temporal Action Detection with Cascade Proposal and Location Anticipation", Jul. 31, 2017, (12 pages).
Girshick et al., "Fast R-CNN", *Computer Vision (ICCV)* Sep. 27, 2015, (10 pages).

(Continued)

*Primary Examiner* — Marcos L Torres
(74) *Attorney, Agent, or Firm* — Nixon & Vanderhye, P.C.

(57) ABSTRACT

Iterative prediction systems and methods for the task of action detection process an inputted sequence of video frames to generate an output of both action tubes and respective action labels, wherein the action tubes comprise a sequence of bounding boxes on each video frame. An iterative predictor processes large offsets between the bounding boxes and the ground-truth.

17 Claims, 16 Drawing Sheets

(56) References Cited

OTHER PUBLICATIONS

Liu et al., "SSD: Single Shot Multibox Detector", Dec. 29, 2016, pp. 1-17.
Peng et al., "Multi-region Two-Stream R-CNN for Action Detection", pp. 1-16.
Singh et al., "Online Real-Time Multiple Spatiotemporal Action Localisation and Prediction", pp. 3637-3646.
Hou et al., "Tube Convolutional Neural Network (T-CNN) for Action Detection in Videos".
Kalogeiton et al., "Action Tubelet Detector for Spatio-Temporal Action Localization".
Wang et al., "Non-local Neural Networks", pp. 7794-7803.
Carreira et al., Quo vadis, action recognition? A New Model and the Kinetics Dataset, Feb. 12, 2018, pp. 1-10.
Carreira et al., "Human Pose Estimation with Iterative Error Feedback", Jun. 12, 2016, pp. 1-10.
Najibi et al., "G-CNN: an Iterative Grid Based Object Detector", pp. 2369-2377.
Gregor et al., "DRAW: A Recurrent Neural Network For Image Generation", Feb. 16, 2015, pp. 1-10.
Girshick et al., "Rich Feature Hierarchies for Accurate Object Detection and Semantic Segmentation", pp. 1-10.
Cai et al., "Cascade R-CNN: Delving into High Quality Object Detection", pp. 6154-6162 9CVPR 2018).
Yang et al., "CRAFT Objects from Images", Apr. 12, 2016, pp. 1-9.

\* cited by examiner

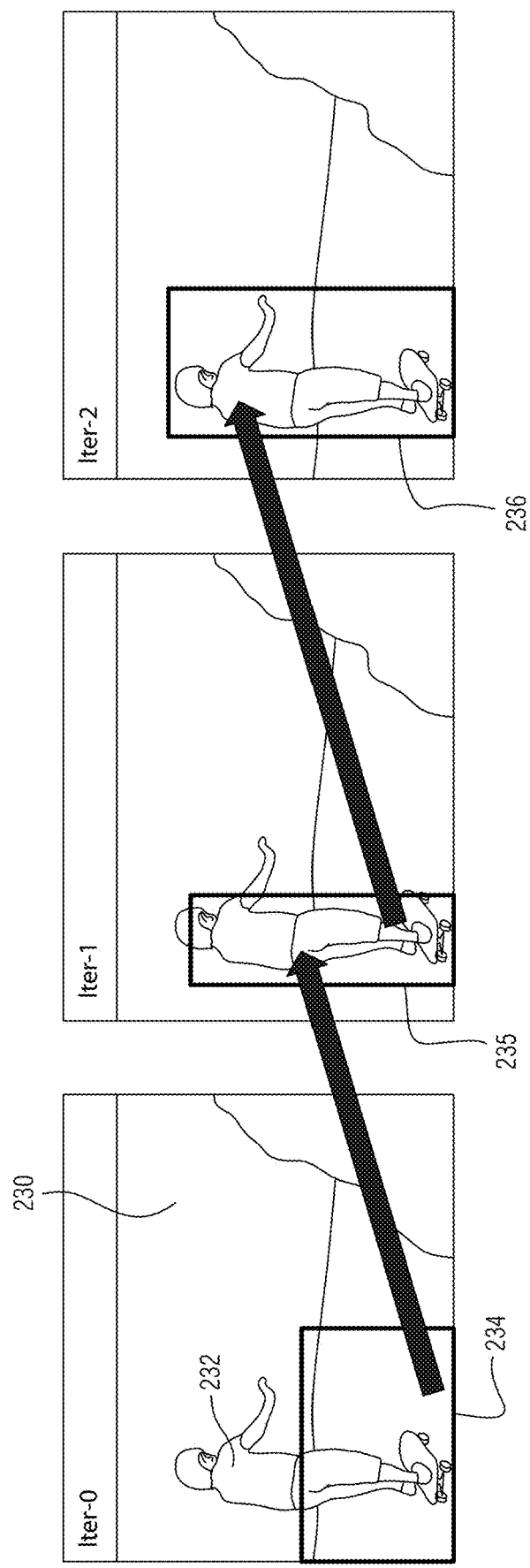

ITERATIVE SPATIO-TEMPORAL ACTION DETECTION IN VIDEO

CROSS-REFERENCE TO RELATED APPLICATIONS

This application claims the benefit of priority from U.S. Provisional Patent Application No. 62/568,285 filed on Oct. 4, 2017, the entire content of which is incorporated herein by reference.

FIELD

The technology herein relates to computer vision and video processing, and more particularly to an iterative network for spatio-temporal action detection in videos.

BACKGROUND

Spatio-temporal action detection is a key element in high-level video understanding. Action detection is a very challenging problem in computer vision, since it requires not only identifying what action is happening in the video, but also where it is happening both spatially and temporally. Also, action detection is different from general video object detection tasks in that motion may play a much more important role in detecting action than it does for general objects, since many actions (e.g., running vs. walking) are, by definition, only identifiable from motions.

Most existing action detection methods build upon static image detection methods like R-CNN/Faster-R-CNN and SSD, which means the detection decisions are made on the frame level. See e.g., Gkioxari and Malik, "Finding action tubes" (CVPR 2015); and Peng and Schmid, "Multi-region two-stream R-CNN for action detection" (ECCV 2016).

Many of the conventional techniques for action detection incur high costs in terms of computation and memory resources. These conventional techniques may require several hundreds, or sometimes even more than a thousand, anchors to initialize detection. Detection over several frames makes this explosion of anchors much worse in conventional techniques. Moreover, due to the use of very short clips (e.g., 0.25 seconds or shorter), the conventional techniques may frequently return incorrect classifications.

Therefore, improved techniques for action detection in video are needed.

BRIEF DESCRIPTION OF THE DRAWINGS

The following detailed description of exemplary non-limiting illustrative embodiments is to be read in conjunction with the drawings of which:

FIG. 2C shows an example regression of an action tube, according to some example embodiments.

DETAILED DESCRIPTION OF EXAMPLE NON-LIMITING EMBODIMENTS

Figure 1A:
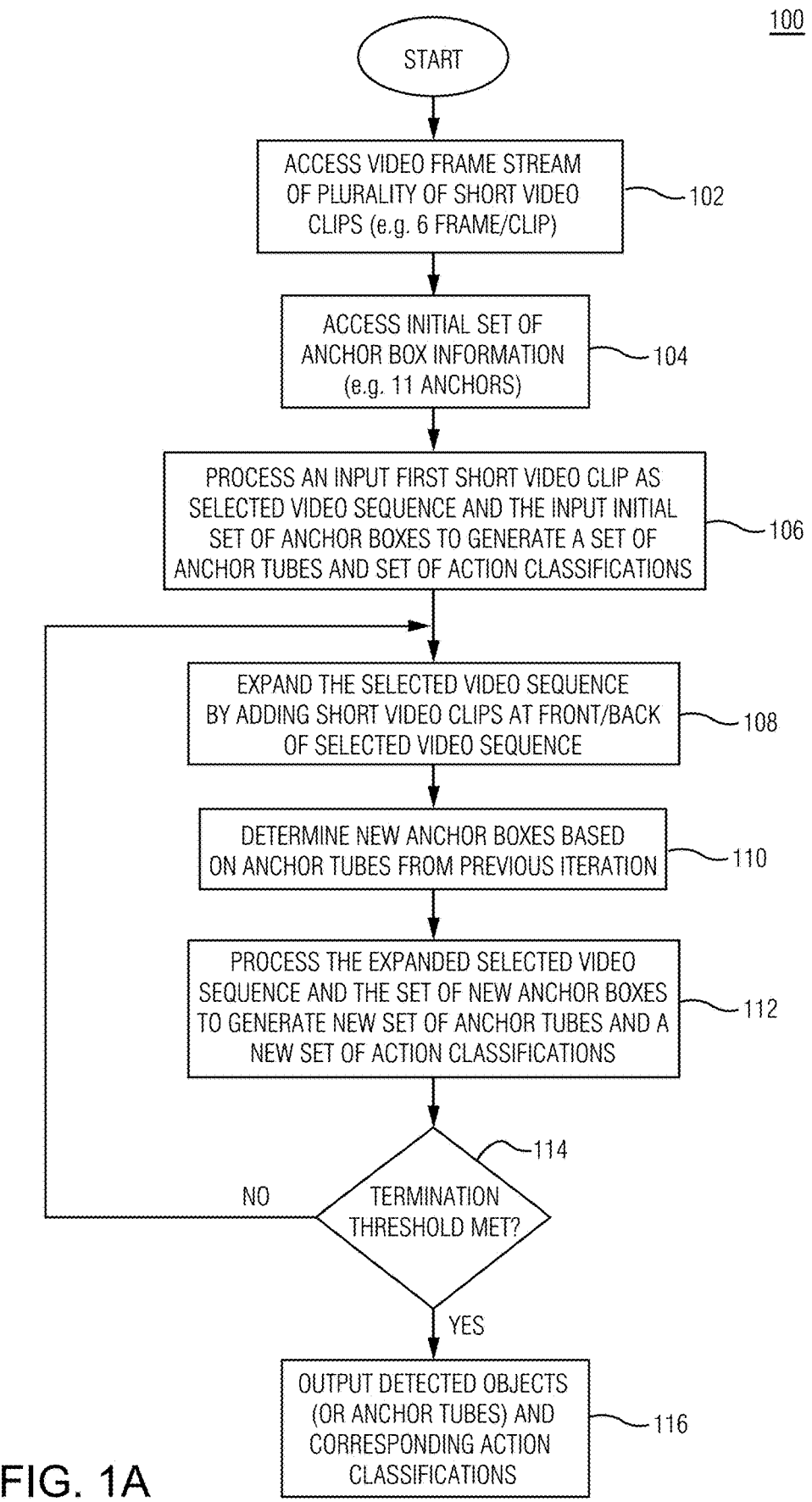
FIG. 1A shows a flowchart of a process for iterative action detection in video, in accordance with some example embodiments.

Example embodiments provide action detection in video streams while avoiding the above mentioned deficiencies of convention action detection techniques. One aspect of the example non-limiting technology herein is that it is more natural to predict the action of a sequence of frames as a whole. An important technical contribution of this example non-limiting technology is the idea of iterative predictions for action detection in videos.

Most existing approaches for action detection in video are based on the paradigm referred to as "sliding-window detection", in which a set of anchors with various sizes and aspect ratios are placed densely over an image (or a clip), and the detection window slides over the anchors in a sliding-window manner. Additionally, most existing action detection approaches adopt a proposal-based paradigm in which a large number of proposals (using either off-the-shelf proposal algorithms or the sliding-window technique) are generated, with varying sizes and aspect-ratios, throughout frames, and then to predict the class label for each of them.

These approaches are not optimal since (1) they require large amounts of computation to brute-forcedly examine many proposals; (2) these proposal based approaches ignore the relationship between human parts and the entire human form since they only performs foreground/background classification for any one given proposal; and (3) the human brain does not detect actions by first generating thousands of proposals, but instead solves the task in a coarse-to-fine manner.

Example embodiments described in this application provide a different/enhanced approach which is an iterative prediction approach for the task of action detection. The inventors discovered that relative to conventional techniques, the number of anchors can be drastically reduced while at the same time using longer clips to improve classification accuracy. Some example embodiments provide an action detection approach to start from only very few initial "anchor tubes" and to refine the predicted anchor tubes over multiple iterations of processing. Experiments have shown that with as few as 11 anchors, some example embodiments can exceed the performance/accuracy of conventional techniques. The example embodiments use techniques which are more similar to how humans process visual information. Since the mapping from video to localized action tube is highly complicated, this iterative prediction approach simplifies the prediction problem with each iteration.

Example embodiments perform action detection in an iterative and coarse-to-fine manner. Specifically, according to some embodiments, the action detection task begins with only very few initial spatio-temporal action tubes (in contrast to the thousands of anchors used in the conventional proposal-based approaches) and iteratively refines the anchor tubes. A corresponding training strategy is proposed and several design choices are developed. In contrast to the above mentioned conventional techniques, example embodiments can exploit the relationship between detected parts of a human and the entire human form and learns how to move from a human part (e.g., head, torso) to the entire human.

Example non-limiting systems and methods herein take a sequence of video frames as input, and output both the action tubes, i.e., a sequence of bounding boxes on each frame, and their respective action labels. Unlike in conventional approaches, example embodiments do not need to use a proposal or slide-window based approach, which generates thousands of initial tubes spanning all over the frame spatially, since the iterative predictor of example embodiments is able to accommodate much larger offsets between the initial box and the ground-truth.

The example non-limiting technology herein demonstrates the ability of deep convolutional neural networks trained in GPUs (see e.g., FIG. 2E) or other parallel processing unit (PPU) to solve challenging computer vision problems including action detection for real-world systems.

Example Process for Action Detection

Figure 1B:
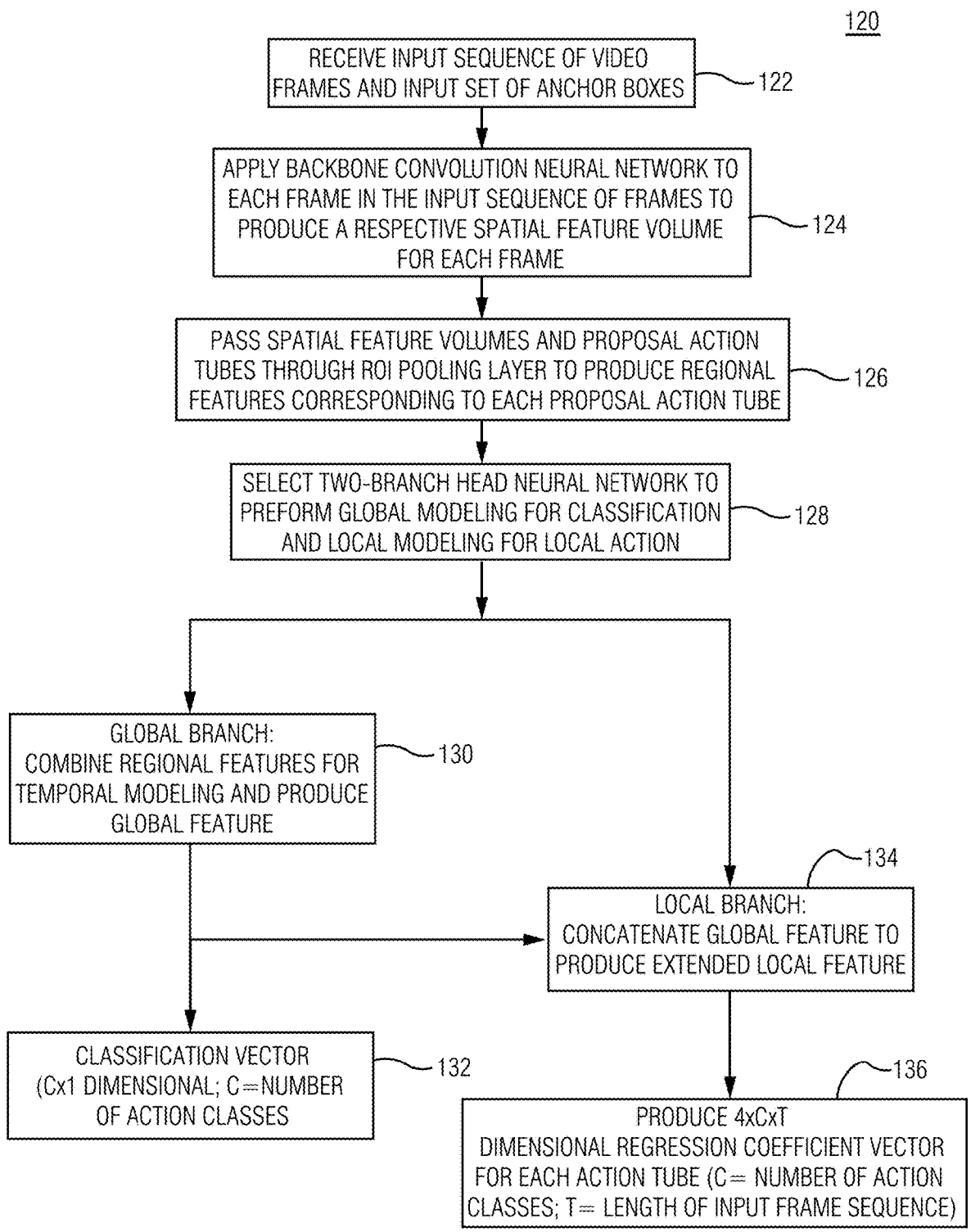
FIG. 1B shows a flowchart of a process for regression of action tubes and classification of actions in a particular iteration of the process of FIG. 1A, according to some embodiments.

A method of action detection in video according to some example embodiments is illustrated in FIGS. 1A and 1B. FIG. 1A illustrates a flowchart of an overall iterative process 100 for action detection in video. FIG. 1B illustrates a flowchart describing the processing 120 associated with an iteration.

After entering process 100, at operation 102, a video frame stream is accessed. The accessed video frame stream may be from previously captured ad stored video or video that is currently (in real-time) being generated by (or based on input from) one or more cameras. The video frame stream includes a plurality of short video clips. A "short video clip", as the term is used in this application, includes between 2 and 20 video frames. In some example embodiments, the short video clips each consists of six frames.

Figure 2A:
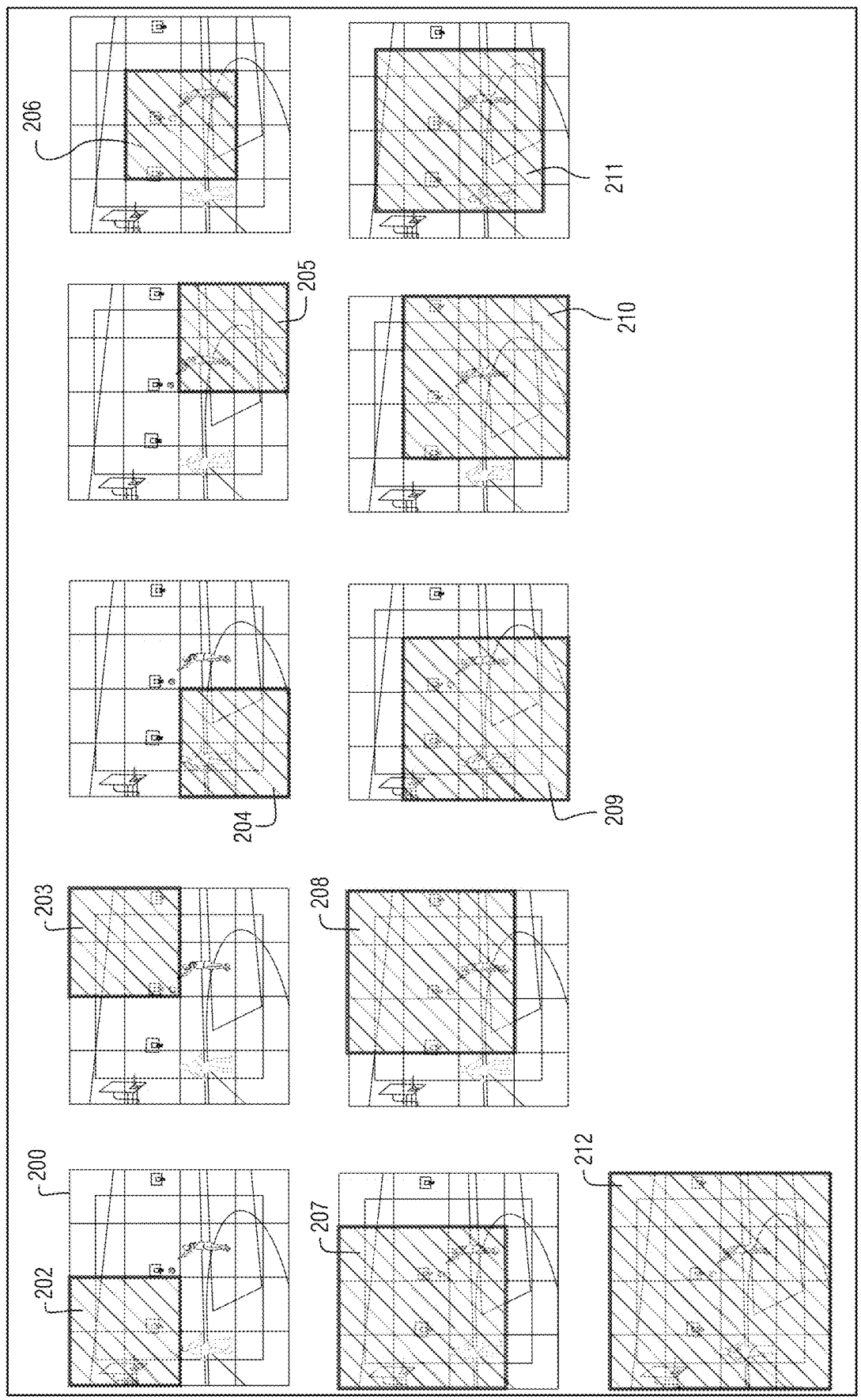
FIG. 2A shows an arrangement of an initial set of anchor tubes on a video frame, according to some example embodiments.

At operation 104, process 100 accesses configuration parameters including the configuration of the set of initial anchors. The configuration parameters may be accessed from a memory such as a hard disk memory or random access memory to where the parameters were previously stored. Without loss of generality, this application uses the terms "anchor" and "anchor box" interchangeably. But an anchor may, in some embodiments, be in shapes other than box or rectangular shapes. The set of initial anchors specify the locations in a frame for placing (e.g., overlaying) each of the initial anchor boxes. The number of anchors defined in the set of initial anchors in embodiments is in the range of 9-99 anchors. The small number of initial anchors enable the embodiments to more efficiently perform action detection than conventional action detection systems that use hundreds, or sometimes more than a thousand, initial anchors. In certain example embodiments, the set of initial anchors consist of 11 anchors. An arrangement of 11 initial anchors is shown in FIG. 2A.

At operation 106, one of the short video clips from the accessed plurality of video clips and the initial set of anchors are taken as input, and processing is performed to generate a set of anchor tubes (or, equivalently, also referred to as "action tubes") and a set of action classifications.

An "anchor tube" (alternatively, an "action tube") refers to a particular anchor as it is arranged in a plurality of consecutive video frames. For example, the anchor tube corresponding to a particular anchor would include the bounding box corresponding to that anchor as it appears in each of the consecutive frames. Put another way, whereas "anchor" is a 2D concept (i.e., a 2D box on a frame), "anchor tube" is a 3D concept (i.e., a sequence of 2D boxes on several consecutive frames).

An "action classification" is the assignment of a particular anchor (or anchor tube) to a particular class of action. In example embodiments, each anchor or anchor tube is subjected to regression and classification processing to eventually output one or more corresponding action classifications (e.g., represented by a classification label), and optionally, the respective associated confidence levels. More specifically, "regression" is used to update the spatial location and size of each anchor in a tube, and "classification" is used to output corresponding action label.

At operation 106, according to some embodiments, an anchor tube is formed corresponding to each anchor in the set of initial anchors. In some other embodiments, only some of the anchors in the set of initial anchors will have a corresponding generated anchor tube. A respectively computed action classification is associated with each of the generated anchor tubes or each of the generated anchor tubes which corresponds to a foreground action. In many instances, only some of the anchor tubes correspond to foreground actions.

Figure 1C:
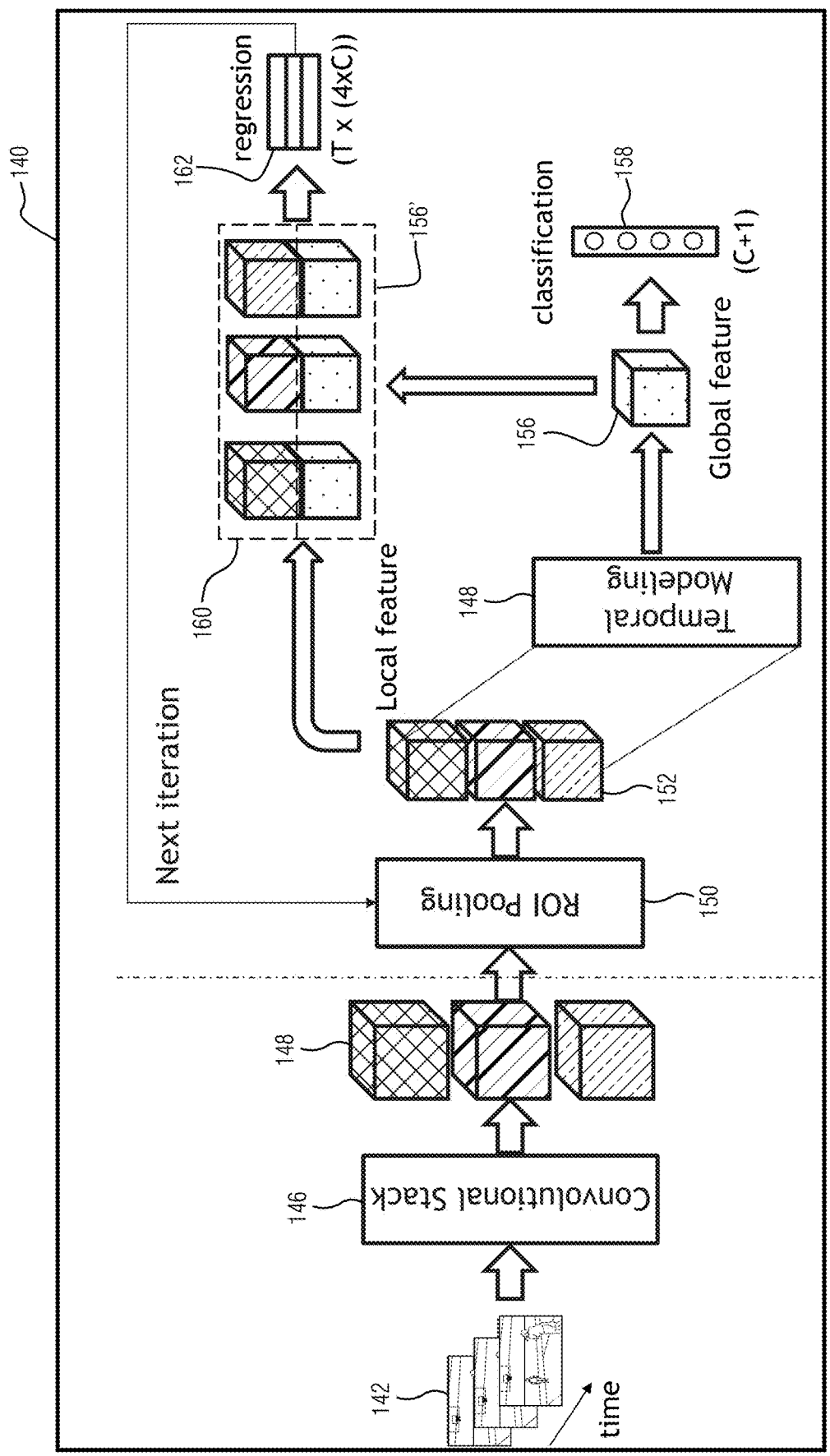
FIG. 1C schematically illustrates the overall architecture of an iterative action detection network, according to some example embodiments.
Figure 1D:
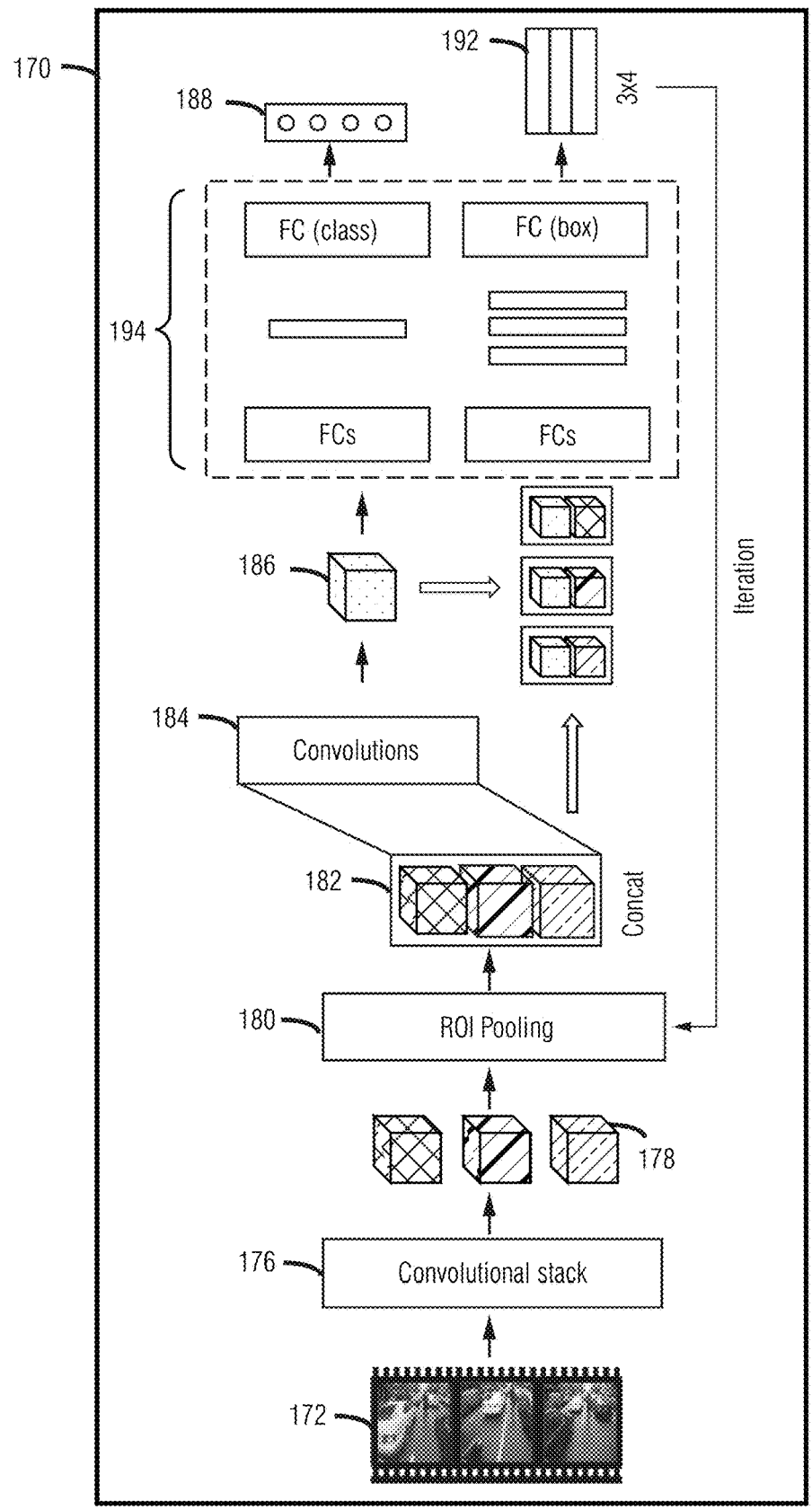
FIG. 1D shows another schematic illustration of the overall architecture shown in FIG. 1C.
Figure 2B:
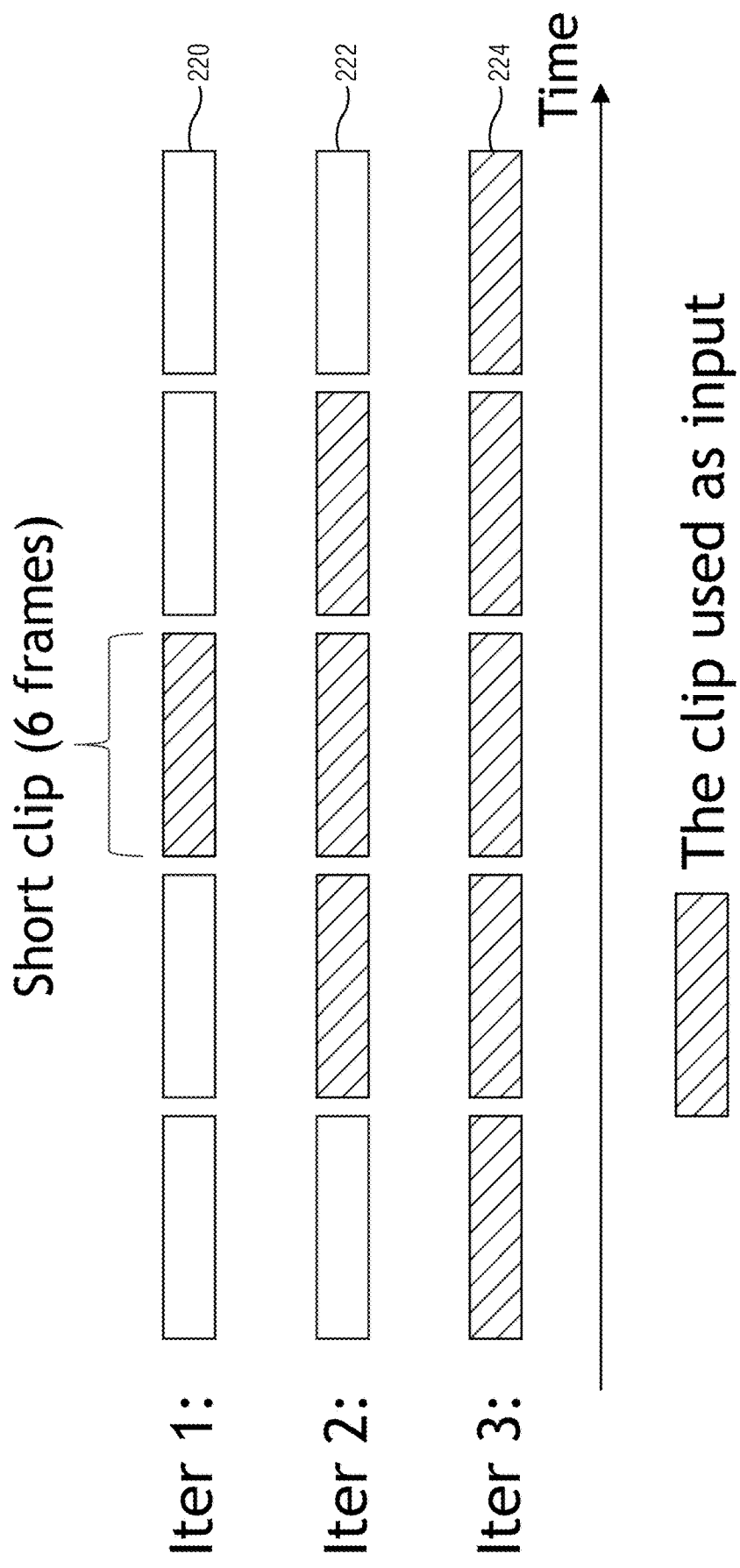
FIG. 2B shows expansion of the input video frame sequence over multiple iterations, according to some example embodiments.

Operation 106 may be considered the first iteration in the iterative process 100. The initial anchor tubes temporally span over the sequence of frames with a fixed spatial extent. After that, the iterative approach of example embodiments is performed, which involves both spatial and temporal scales (illustrated in FIGS. 1C-1D). At a specific iteration i (i>1), the regression output from the previous iteration i−1 is taken as the proposal tubes for the current iteration. By doing so, the location of the action tubes are continually refined over iterations. In the meantime, the proposal tubes are extended temporally to the adjacent clips and include the frames of these adjacent clips into the input sequence (as shown in FIG. 2B). By progressively consuming longer clips, the model in example embodiments can utilize more temporal information and improve the classification accuracy. The processing associated with operation 106 is described in more detail in relation to FIG. 1B. As noted above, the example embodiments iteratively refine the set of initial anchors or anchor tubes and action classifications while expanding the input video frame sequence at the beginning of each iteration by adding adjacent video clips to the previously processed sequence of video frames. As further described below, operations 108-112 are repeated for one or more iterations.

At operation 108, the input video sequence is expanded by adding more video frames. According to some embodiments, at least one short video clip is added. According to an example embodiment, two short video clips (e.g., clips of 6 video frames each) are added to the video frame sequence processed in the immediately preceding iteration. One of the two added short video clips is immediately adjacent to the previously processed video frame sequence and precedes the previously processed video frame sequence in time; the other of the two added short video clips is also immediately adjacent to the previously processed video frame sequence but follows the previously processed video frame sequence in time. An example of the input video frame sequence expansion over successive iterations is shown in FIG. 2B.

At operation 110, a set of new input anchors (or set of new input anchor tubes) is determined based on the anchor tubes generated and regressed in the previous iteration. For each anchor in the set of new input anchors, the corresponding position may be predictively determined from the corresponding anchor tube used in the preceding iteration and/or trends that are derivable from the corresponding anchor tube. The corresponding positions are determined by the local branch (also referred to as the regression branch) shown in FIG. 1C.

At operation 112, taking the expanded video frame sequence and the new set of anchors or anchor tubes as input, processing is performed to generate a regressed set of anchor tubes and a further refined set of action classifications. The processing associated with generating the regressed set of anchor tubes and refined set of action classifications is described below in relation to FIG. 1B.

At operation 114, it is determined whether a predetermined threshold and/or other termination criteria has been satisfied. For example, some embodiments may be configured to terminate after any one or more of the following conditions are satisfied: a specified number of iterations (e.g., 3 iterations) has been completed, or the length of the input video frame sequence has reached a maximum number (e.g., 30 frames) or a maximum time (e.g., 0.5 seconds). Other termination criteria may include more anchor tube accuracy and/or action classification accuracy. For example, an example termination criteria may be one or more of the action classifications associated with an anchor tube exceeding a threshold probability (e.g., 0.95 confidence).

When the termination conditions are not satisfied at operation 114, process 100 proceeds to operation 108 to begin the next iteration of processing for action detection.

If the termination conditions are satisfied at operation 114, then at operation 116 detected objects/persons and/or corresponding anchor tubes (or anchors), and the action classification or classifications corresponding to each of the anchor tubes (or anchors) are output. The output may be stored for subsequent use or may be provided to an online/currently active application for further processing. For example, the output set of regressed anchor tubes and the associated classifications can be provided to a surveillance system for identifying persons and/or actions that appear in surveillance video. In some embodiments, process 100 may be part of an application associated with an autonomous vehicle, and the output of process 100 may be used by the application to reliably determine the actions (e.g., walking, running, standing by the side of the road, attempting to step on to the road, etc.) in which persons appearing in the vehicle's camera view are engaged in, so that the vehicle's control systems can be automatically controlled to react appropriately to the presence of such persons in the camera view. The use of the output of process 100 by numerous other applications is also contemplated in embodiments. Automated video annotation is another example application that can utilize the output of process 100.

FIG. 1B illustrates a flowchart for process 120, according to some example embodiments. Process 120 may be performed in the processing associated with each iteration. For example, process 120 may be performed during the processing of each of the operations 106 and 112 described above in relation to FIG. 1A. FIGS. 1C and 1D show example systems on which process 120 can be performed.

After entering process 120, at operation 122, process 120 receives an input sequence of video frames and an input set of anchors (or anchor tubes). For example, when process 120 is being performed during operation 106, the input to process 120 may include the initial set of video frames (e.g., initial clip of six frames) and a set of initial anchors (or set of initial anchor tubes).

At operation 124, a backbone neural network is applied to each frame in the input sequence of frames to generate a respective spatial feature volume for each anchor tube. The backbone network can be any CNN such as, but not limited to, VGG16, ResNet, etc.

At operation 126, the spatial feature volumes and proposal action tubes are passed through an ROI (region of interest) pooling layer to produce regional features corresponding to each proposal anchor tube. The ROI pooling layer network operates to extract, from the respective frame level feature volumes, the regional features corresponding to each of the respective ROI corresponding to each proposal anchor tube. The ROI pooling layer may be a CNN such as, but not limited to, VGG16, ResNet, etc.

At operation 128 a head neural network is selected for processing the regional features associated with each anchor tube. According to some embodiments, the head network selected for each iteration, or at least for some iterations, may be different from the head network selected for other iterations. In some embodiments, the same head network may be used for all iterations.

The selected head network may be a two branch head network that is configured to perform global modeling for action classification and local modeling for detecting localized actions.

During the head neural network processing, at operation 130, the regional features generated at operation 126 are combined for temporal modeling and for producing global features.

The produced global features are, at operation 132, used to generate an action classification vector. The action classification vector may be of C×1 dimension, where C is the number of configured or predetermined action classes.

Operations 130 and 132 belong to what is referred to in this application as the "global branch".

The produced global features are also provided to the "local branch" of the same head neural network. The local branch in the illustrated embodiment includes operations 134 and 136.

At operation 134, the global features determined at operation 130 are combined and/or concatenated with the regional features generated at operation 126.

At operation 136, a 4×C×T dimensional regression coefficient vector is produced for each anchor tube, where 4 represents the spatial adjustment for each anchor, C is the number of action classes and T is the length of the input frame sequence.

Example Networks for Action Detection

Example video processing network architectures according to some embodiments, are illustrated in FIGS. 1C and 1D.

A network architecture 140 according to some example embodiments is illustrated in FIG. 1C. The network comprises a backbone network 146, a ROI pooling layer network 150 and a head network 164. Specifically, given a sequence of frames 142, a backbone network 146 is applied to each frame individually and provides a spatial feature volume 148 for each of them (shown in different fill patterns in FIG. 1C). After that, the feature volumes 146, together with the proposal tubes (not shown), are passed through a ROI pooling layer 150 to produce regional features 152 corresponding to each proposal tube. The regional features 152 are then fed to the head network (e.g., global branch including 148 and the local branch) for both classification and regression. A two-branch design is used for the head network, one performs global modeling for accurate classification and the other performs local modeling for precise localization. The motivation is that the two tasks have substantially different objectives, which requires different types of information and architecture design. In particular, the so-called "global branch" combines the regional features for temporal modeling and produces the global feature 156 (illustrated as a dotted fill patterned cube in FIG. 1C). The global feature 156 encodes the information of the entire tube (and, in some embodiments, the context information as well) and is used for action classification. The classifications are used to produce a C×1 classification vector 158. The temporal modeling 148 for the global branch can utilize any network such as RNN, 2D convolution, 3D convolution, etc., although experiments with at least some embodiments have yielded best results with 3D convolution. For the "local branch", first, the global feature is concatenated with each of the regional features to produce the extended local features (e.g., the combination of the respective regional feature blocks 160 with global feature block 156'). The extended local features not only encode the global information, but also remain the detailed local information at each frame. The features are then used to produce a 4×C×T dimensional regression coefficient vector 162 for each tube, where C is the number of classes and T is the length of the input frame sequence.

FIG. 1D illustrates another example video processing network according to some embodiments. As illustrated in FIG. 1D, the iterative prediction approach for the task of action detection according to an embodiment, takes a sequence of video frames 172 as input, and outputs both the action tubes 192, i.e., a sequence of bounding boxes on each frame, and their respective action labels 188. In contrast to conventional techniques for action detection which generate thousands of initial tubes spanning all over the frame spatially, the illustrated example embodiment does not require use of a proposal or sliding-window based approach since its iterative predictor is capable of accommodating a much larger offset between the initial detection box and the ground-truth.

Specifically, first a convolutional stack 176 (which can be any classical convolutional neural network (CNN) such as AlexNet, VGG16, ResNets, etc.; VGG16 is used in the illustrated embodiment for its good performance and moderate computation cost) is applied onto each frame individually and produces a spatial feature volume 178 for each of them (shown in different patterns in FIG. 1D). Then, the feature volumes 178, together with the initial anchor tubes (not shown in FIG. 1D), are passed through the ROI pooling layer 180 to produce features 182 corresponding to the initial tubes. More detail concerning an ROI pooling layer may be found for example in Girshick et al, "Fast R-CNN", Computer Vision (ICCV) 2015. The generation of initial action tubes is described in a later section of this application, and for now it is without loss of generality to assume the initial tube to be consisting of one bounding box that covers the entire frame on each frame.

The ROI pooled features 180 are now what may be referred to as "local features" which describe only contents inside the detection box. In contrast, the other branch concatenates the ROI pooled features 180 from different frames and passes the concatenation on through a convolutional layer 184 to produce "global features" describing contents in the entire tube (illustrated as cube 186 in FIG. 1D). Both local and global features are concatenated 190 and processed with fully-connected layers 194 to produce a 4-dimensional regression coefficient vector for each box (the parameterization of which is described later in this application). For classification, the action decision should be based on the action tube, i.e., a sequence of bounding boxes, instead of individual single detection boxes on each frame. Therefore, the global features is directly acquired and passed on to fully-connected layers 194 for classification.

The architecture iterates the operation of ROI pooling 180 and subsequent operations 184 and 194 as needed. According to at least some embodiments, the video processing networks shown in FIGS. 1C and 1D comprise neural networks.

Example Anchor/Anchor Tube Arrangement

FIG. 2A illustrates an example set of initial anchors, according to some embodiments. The illustrated initial set of anchors consists of 11 anchors (shown as anchors 202, 203, 204, 205, 206, 207, 208, 209, 210, 211 and 212 arranged on frame 200) with predefined respective positions on a frame as shown in FIG. 2A. In this particular non-limiting embodiment, for each scale ½ and ¾ (e.g., "½" means half of each dimension (row or column) not the entire image size), respective anchor boxes are arranged at 5 different positions like shown in FIG. 2A yielding 5×2=10 action tubes. With the addition of an action tube that covers the entire frame, the embodiment yields a total of 11 action tubes. In some embodiments, the set of initial anchors may be in a predefined anchor arrangement that is independent of features in any of said video frames.

Example Iterative Expansion of Input Video Sequence

FIG. 2B illustrates an example expansion of the input video frame sequence over multiple iterations. In the example shown, in the first iteration the selected input frame sequence 220 includes one short clip (e.g. clip of 6 frames); in the second iteration, the newly selected input frame sequence 222 includes, in addition to the frame sequence 220, the short clips that are immediately adjacent to the frame sequence 220 before and after; and, in the third iteration, the newly selected input frame sequence 224 is formed by expanding the input frame sequence 222 by adding the short clips that are immediately adjacent to the frame sequence 222 before and after.

Example Spatio-Temporal Refining

FIG. 2C shows an example video clip or frame 230 over three iterations regressing an anchor tube to detect the action of person 232 appearing in the frame. As shown, the same anchor tube is regressed to respective shapes 234, 235 and 236 to capture the person 232 to a sufficient completeness so that a classification of the action (e.g., skateboarding) can be made with a high level of confidence.

FIG. 2C illustrates an example of the spatial updating that is one part of the iterative refinement according to some example embodiments. As shown in the figure, spatial update may ensure that the subject of the detection is occupying most of the detection area (e.g., area within one anchor, as shown). Spatial updating can also be used to obtain context information to assist in the action classification task.

Figure 2D:
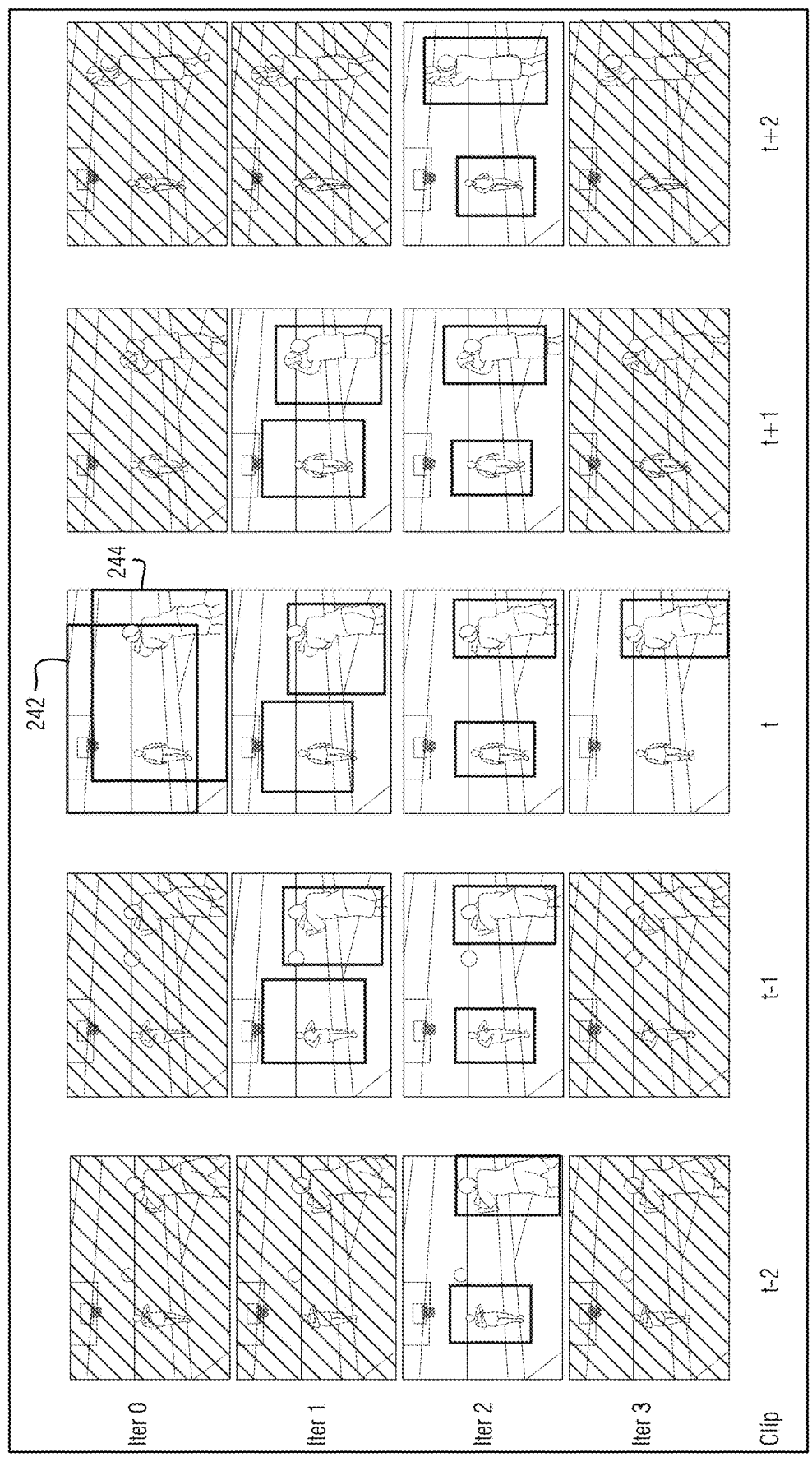
FIG. 2D shows another example regression of action tubes as the input video frame sequence is expanded over multiple iterations, according to some example embodiments.

FIG. 2D shows an example expansion of the input video frame sequence over several iterations, and the associated anchor tube regressing to detect actions, according to some example embodiments. The illustrated example concerns five short video clips ranging from the earlier clip at time t−2 to the latest clip at time t+2.

At iteration 0, the clip at time t is selected as the input video frame sequence. Selection of the clip corresponding to time t enables the subsequent expansion of the input frame sequence as required in embodiments by ensuring that a sufficient number of clips are available on either side of the initially selected clip.

At iteration 0, two initial anchors or anchor tubes 242 and 244 are shown as arranged on the frame or clip. At iteration 0, the anchors or anchor tubes 242 and 244 are in the predefined positions and have not been subjected to regression processing. For each iteration, the input anchor tubes may be specified with respect to the clip corresponding to time t.

At iteration 1, the clips corresponding to times t−1 and t+1 are added to the t clip to expand the input frame sequence. The input anchor tubes for iteration 1 are determined based on the regression of the anchor tube in iteration 0, and may be specified with respect to the clip corresponding to time t. Based on the input anchor tubes specified for the t clip, the anchor tube is expanded to t−1 and t+1 clips. Thus, the anchor tubes shown for t−1 and t+1 clips in FIG. 2D are extrapolated from the anchor tube of the t clip.

At iteration 2, the clips corresponding to times t−2 and t+2 are added to the sequence of frames having clips t−1 to t+1, to again expand the input frame sequence. Each of the anchor tubes 242 and 244 are regressed over the expanded input frame sequence such that now the anchor tube 244 has sufficient information to detect the player detected within 244 going through the motions that can be reliably classified as associated with the playing of basketball.

At iteration 3, the t clip may be returned with the regressed anchor tubes. Sufficient information based on regressed anchor tube 244 was obtained ibn iteration 2 based on clips ranging from time t−2 to time t+2 to arrive at an action classification of "shooting a basketball". As shown, at iteration 4, the clip at time t may be output with the regressed anchor tube corresponding to the player performing the action and the determined classification label.

FIG. 2D illustrates the spatial updating as well as the temporal updating that are parts of the iterative refinement process according to some example embodiments. The spatial updating is illustrated by the refining of a respective anchor arranged in a particular clip, as shown over several iterations. This example also illustrates, in addition to focusing the detection area on the subject, that spatial updating can be used to obtain context information. For example, the clips t−1 and t+1, provide the necessary information for associating the catching and shooting of a ball with the subject. The temporal updating is illustrated by the regression of the respective anchor tubes over consecutive short clips. The temporal updating by adding adjacent clips enables the determination and classification of actions, such as, for example, that the subject associated with anchor tube 244 is performing the action of shooting a basketball.

FIG. 2D also illustrates the usefulness of iteratively expanding the input video frame sequence. The iterative approach of embodiments enable reduced computational cost and memory considering a few short video clips at a time. The approach enables achieving good performance using only very few anchors, and/or by decomposing a highly non-linear task into easier sub-tasks. It also enables progressively improving the detection performance. By considering a few short clips at a time, embodiments also enable the problem of anchor tube drifting over time. For example, if a long clip with 30 frames is considered, due to tubes drifting spatially (e.g., with actions that cause movements spatially), it may be difficult to accurately capture a ground truth bounding box. However, gradual expanded anchor tubes as used herein can more accurately capture the ground truth (e.g., in FIG. 2D, the player movements in anchor tube 244.

Example Non-Limiting Training

Example embodiments may use either a joint training scheme or a stage-wise training scheme. Some experiments have shown that using a joint training scheme to train a model yields better action detection and classification accuracy that the stage-wise training.

The joint training scheme is more simple and efficient than the stage-wise training counterpart, and also provides good performance. At each iteration, two loss functions— the cross-entropy loss for classification and the smooth-L1-loss (e.g. Girshick, Ross. "Fast R-CNN." Computer Vision (ICCV), 2015) for regression are jointly optimized. The regression is class specific, i.e. different regression outputs correspond to different actions. The parameterization of the regression coefficient may be the same as in Girshick et al. The complete loss function can be written as shown in equation (1):

$$L = \Sigma_i L_{cls}^i + \lambda L_{reg}^i \qquad (1)$$

where λ is used to balance the contribution of the two losses.

One key element for the model training is the selection of positive and negative proposal tubes. A standard practice for this is to select the positive samples according to the Intersection over Union (IoU) between the proposal tubes and the ground truth tubes. Specifically, a proposal tube is viewed as a positive sample if its IoU is above a given threshold d, and vice versa (if no proposal tube satisfies the criteria, the one with the largest IoU is selected as positive sample). The threshold d is an important hyper-parameter that affects the number of, as well as the quality of, the positive samples. In experiments with some embodiments, an incremental $d_i$ may be for each iteration (e.g. set $d_i$=0.2, 0.5, 0.5 for i=1,2,3 in experiments). By doing so, a sufficient number of positive samples may be made available at the early iterations, and also guarantee good quality of positive samples at the late iterations. Note that the number of positive samples will not decrease much at the late iterations as the proposal anchor tubes are refined over iterations and have continually improved quality. To enrich the diversity of the negative samples and include more hard negatives, all regression outputs from the previous iteration may be utilized. Specifically, example embodiments may sample from the regression outputs that have IoU lower than di, with sampling probability in proportional to the classification scores of that tubes. Intuitively, a proposal tube with low IoU but high classification score is more likely to be a hard negative, e.g. a human not performing the action. The maximum number of positive samples for a sequence may be constrained to be 5, in order to balance the ratio between the positive and negative samples.

Another problem during training is the drift of both input and output distributions. The input distribution, i.e. IoU distribution, changes over iterations because the proposal tubes keep being refined and the IoU increases gradually. The output distribution, i.e. the distribution of the regression coefficients, changes accordingly, as the regression coefficients tend to decrease over iterations. As a result, some embodiments may use separate head networks for different iterations to adapt to the distribution drift.

Spatial context information may also be an important clue for correct action classification, as mentioned in the introduction. In order to introduce the context information, some embodiments may expand the spatial extent of the proposal tubes to get the expanded regional features, and then append them along with the original regional features in global branch. As a result, the global feature encodes both the temporal and spatial context information of the entire tube. In some embodiments the early fusion of the RGB image and the flow stack may yield better performance. In particular, the 3-channel RGB image and the 15-channel flow stack may be concatenated along the channel dimension and fed in as input to the model of certain embodiments. Experiments with certain example embodiments have shown that the early fusion strategy is often more effective than the late fusion approach. Examples of late fusion can be found in Peng, Xiaojiang, and Cordelia Schmid, "Multi-region two-stream R-CNN for action detection" (ECCV, 2016), and Singh, Gurkirt, et al "Online real-time multiple spatiotemporal action localisation and prediction" (CVPR, 2017). During inference, a process may start from the initial anchor tubes and execute T iterations for each of the tubes. To update the proposal anchor tubes, the regression output of the class with the highest classification score may be picked. The output from the last iteration may be taken as the final output of the process.

In some embodiments, a stage-wise training approach may be used. Some example embodiments use a combination of two loss functions—the cross-entropy loss for classification and a smooth-L1-loss (see Girshick et al, cited above) for regressing the coefficients. The regression is class specific, i.e. different regression outputs correspond to different actions. And λ constant, which can be set, for example, to 0.01, is used to balance these two loss terms as shown in equation (2):

$$L = L_{reg} + \lambda L_{cls} \quad (2)$$

The input to the network are a batch of images, plus the initial anchor tubes. A technique for choosing the initial tubes may be as follows. First, in contrast to conventional techniques (e.g., Kalogeiton et al., "Action q Detector for Spatio-Temporal Action Localization" (ICCV 2017)), example embodiments do not need to use a slide-window based approach, which generates thousands of initial tubes spanning all over the frame spatially, since the iterative predictor of example embodiments is able to tackle much larger offsets between the initial detection box and the ground-truth. On the other hand, even though there is nothing that technically prevents example embodiments from using only one initial detection box which covers the entire frame, this is not optimal since a single detection box cannot capture multiple persons performing actions in the video. Thus example embodiments initialize with a few anchor tubes (e.g., in one specific case 11) which enable the embodiments to capture multiple actions. An example of the (e.g., 11) initial tubes are shown in FIG. 2A.

To train the iterative prediction network according to some example embodiments, a stage-wise training scheme which adapts both the localizer and classifier to different input distribution over iterations can be used. For example, to train for t-th iteration, a localizer for t−1 iterations can be first executed to get a predicted location $b^{\{t-1\}}$, from which the localizer can be trained to predict the offset between $b^{\{t-1\}}$ and the ground truth, as well as the classifier to predict the action class corresponding to $b^{\{t-1\}}$. More specifically, if the overlap between $b^{\{t-1\}}$ and the ground-truth (with ground-truth class y) is larger than $\sigma_{\{pos\}}$ (which is set to 0.5, for example, in some example embodiments), the class label of $b^{\{t-1\}}$ is assigned as y, otherwise it is considered as belonging to the background class.

An interesting question that arises during training is how to sample initial anchor tubes. The most straightforward way would be to directly compute the average overlap (across frames) between all 11 candidate action tubes and the ground-truth tube, and then picking the anchor tube with the highest average overlap. However, this approach has the problem of biasing towards positive samples—since sampled tubes are always starting with high overlap, it is mostly likely that it would overlap even more after iterative regression process, which means there would barely be any bounding boxes with background class. To solve this, certain example embodiments sample from 11 initial anchor tubes, with sampling probability $p_i$, i=1,2, . . . ,11, in proportion to the exponent overlap to the ground truth. More precisely, the following equation (3) may characterize $p_i$:

$$P_i = \frac{e^{\gamma O_i}}{\sum_j e^{\gamma O_j}} \quad (3)$$

where $O_i$ is the average overlap between the i-th initial tube and the ground-truth. γ here is a constant parameter which determines how "spread" the probability distribution should be—the larger γ is, the higher the probability that a "good" initial tube is sampled with high overlap. Across certain example embodiments, γ may be set to 10 to balance samples with foreground and background classes.

An important non-limiting characteristic of a model according to certain example embodiments is that parameters are shared across iterations, which implies that the model is able to refine arbitrary initializations/predictions. To ensure this, one important training strategy is to mix up outputs from varying number of executions. For example, to train a model in the third iteration, outputs from executing the trained model for 0, 1, 2 times may be mixed up, and fed as the input to training, so that the does not forget how to do regression in early iterations. In certain example embodiments, the current iteration the loss for training current iteration is upweighted. Specifically, in certain example embodiments, the weight for current iteration is set equal to the sum of weights for all previous iterations.

During testing according to certain example embodiments, the proposed network or action tube detector was slid along the time axis. For a particular action tube, for each of its 11 initial tubes, the model is executed for T iterations (the number of iterations the model has been trained for) and the output is taken from the last iteration as the output.

Experimental Results

Certain example embodiments were evaluated on the UCF-101-24 dataset, which is a subset of UCF-101 dataset that has 2284 videos for training and 910 for testing. All videos were already annotated with the action class label as well as the location of the person performing the action. There are in total 24 action classes (e.g., like "Basketball-Dunk", "HorseRiding" and "Surfing", etc.), and their corresponding bounding box annotations. The metric used to evaluate the certain example embodiments is frame level mean average precision (frame-mAP), which is a commonly used metric in object detection and video action detection.

Without much hyper-parameter tuning, the model (e.g., in three iterations) according to the example embodiment achieved 66.7% mAP with only RGB input on the test set of UCF101-24 dataset. The result outperforms the state-of-the-art method of Peng, Xiaojiang, and Cordelia Schmid "Multi-region two-stream R-CNN for action detection." (ECCV, 2016) by over 3%. Using both RGB and flow input, the model according to embodiments achieves 73.2% mAP, which is 3.6% higher than that in Peng et al. The experiment results verify the effectiveness of the approach in embodiments. Notably, the model according to embodiments only uses 11 anchor tubes, while the other contemporary methods usually require over thousands anchors as input (e.g., more than 12000 anchors in the techniques described in Peng, Xiaojiang, and Cordelia Schmid "Multi-region two-stream R-CNN for action detection." (ECCV, 2016); more than 8000 in the approaches described in Singh, Gurkirt, et al. "Online real-time multiple spatiotemporal action localisation and prediction." (CVPR. 2017) and Kalogeiton, Vicky, et al. "Action tubelet detector for spatio-temporal action localization." (ICCV. 2017)).

Example GPU-Based System for Action Detection

Figure 2E:
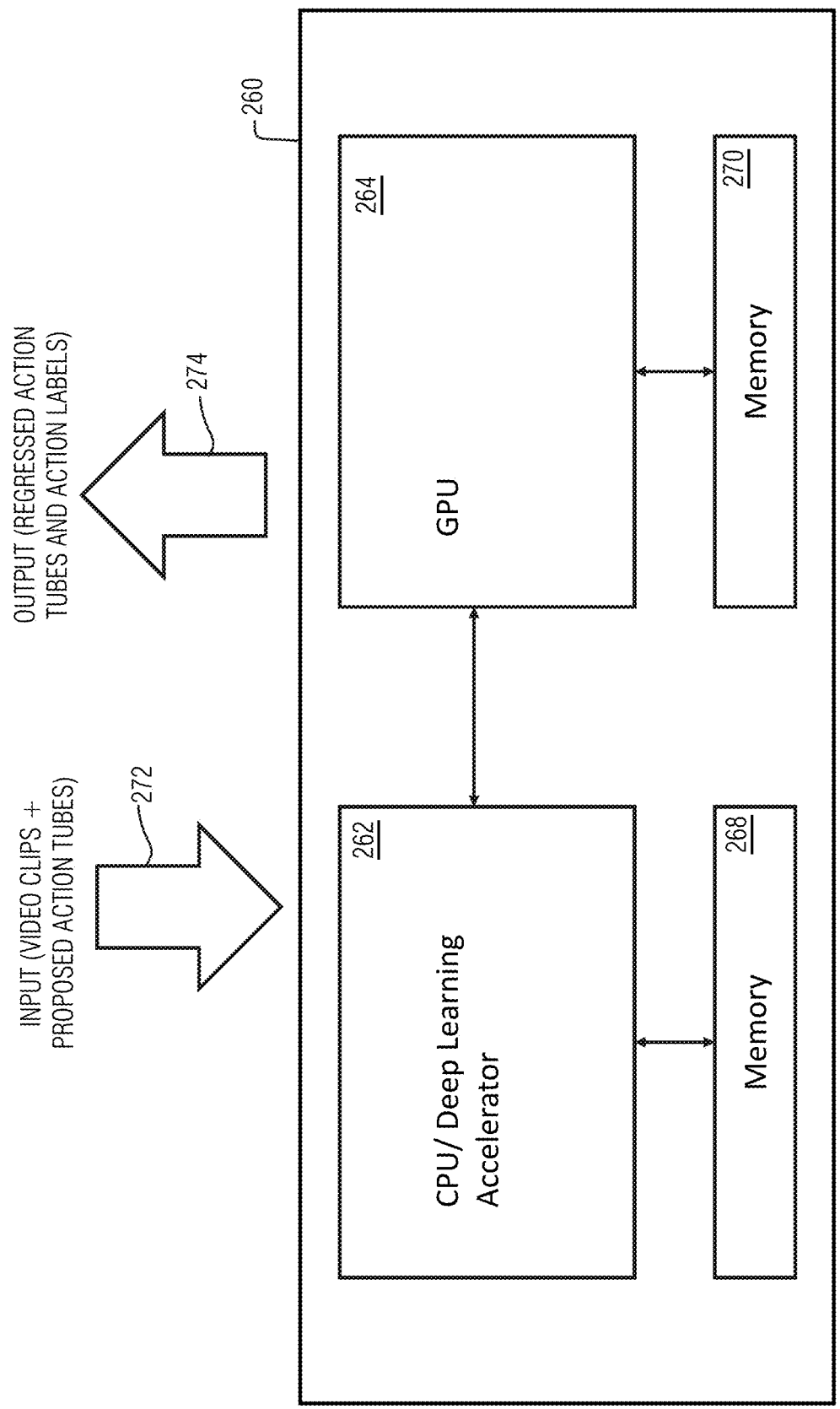
FIG. 2E shows an example non-limiting hardware architecture for implementing the processes of FIGS. 1A and 1B, and the system of FIGS. 1C, 1D.

FIG. 2E illustrates an example system 260 showing a CPU(s), GPU(s) and associated memory. The CPU(s) 262 and GPU(s) 264 execute instructions stored in the memory (ies) 268 and 270 to perform the functions described above. For example, system 260 may be configured to perform processes 100 and 120 described above in relation to FIGS. 1A and 1B. The CPU(s) and/or another specialized processor 262, or one or more GPU(s) may be configured to operate as a deep learning accelerator to perform the training and inferencing described above in relation to processes 100 or 120, and/or neural networks architectures shown in FIGS. 1C and 1D. In an example embodiment, system 260 may accept an initial set of anchors or proposed anchor tubes and a plurality of short video clips each of 6 frames as input 272 and perform processing to eventually generate and output 274 a set of regressed/refined action tubes corresponding to detected actions and a set of action classification labels.

The outputs 274 of system 260 may be provided to an application such as, but not limited to, surveillance, computer vision, machine learning/deep learning, intelligent video analytics, vehicle driver assistance systems, autonomous driving systems, and the like. Such applications may themselves be executing on the system 260 or another processor/system to which system 260 is connected.

According to some embodiments, the GPU 264 and/or a specialized processor used in system 260 may be in accordance with the parallel processing unit described below in relation to FIG. 3.

Example Parallel Processing Unit

Figure 3:
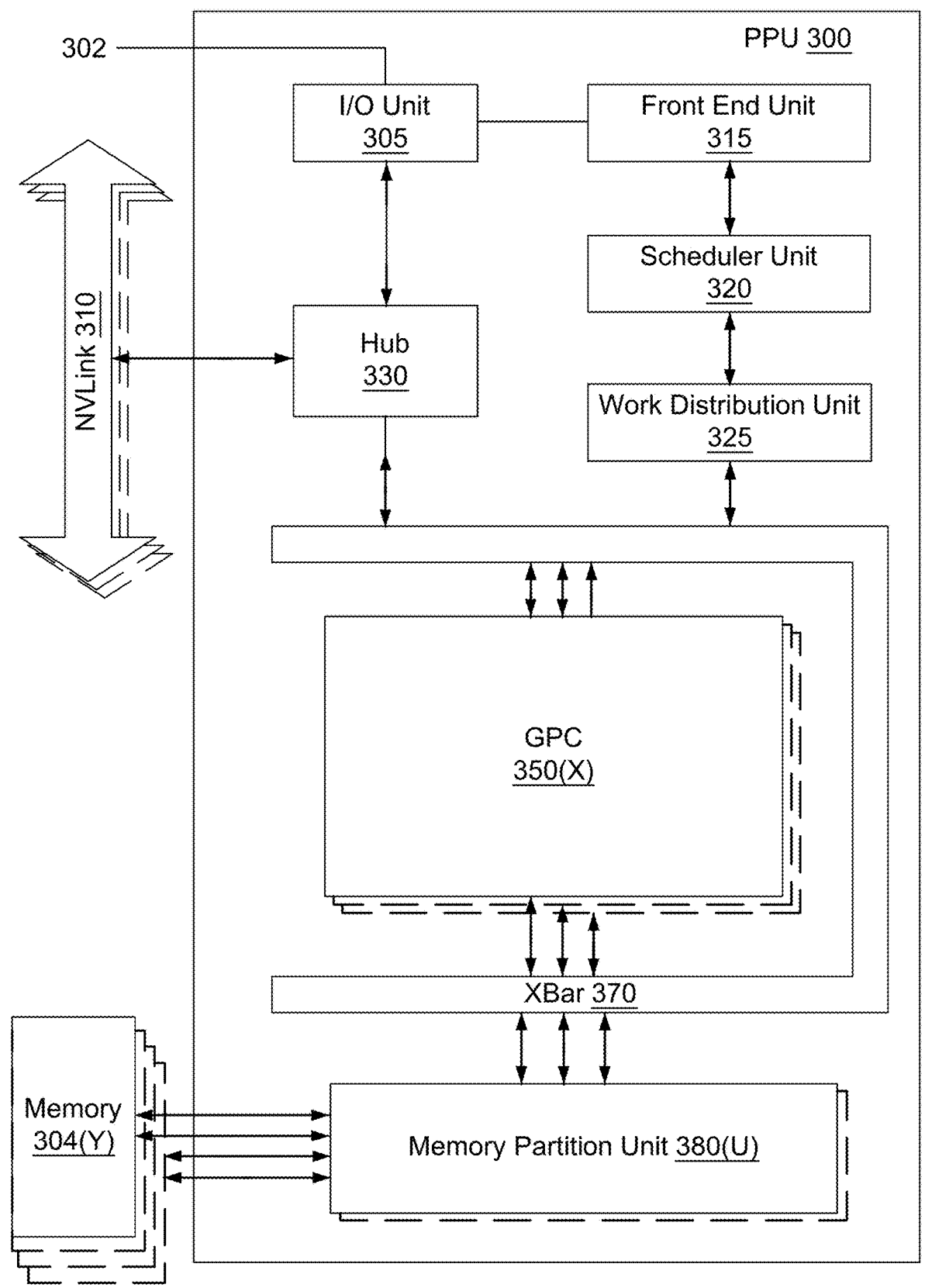
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
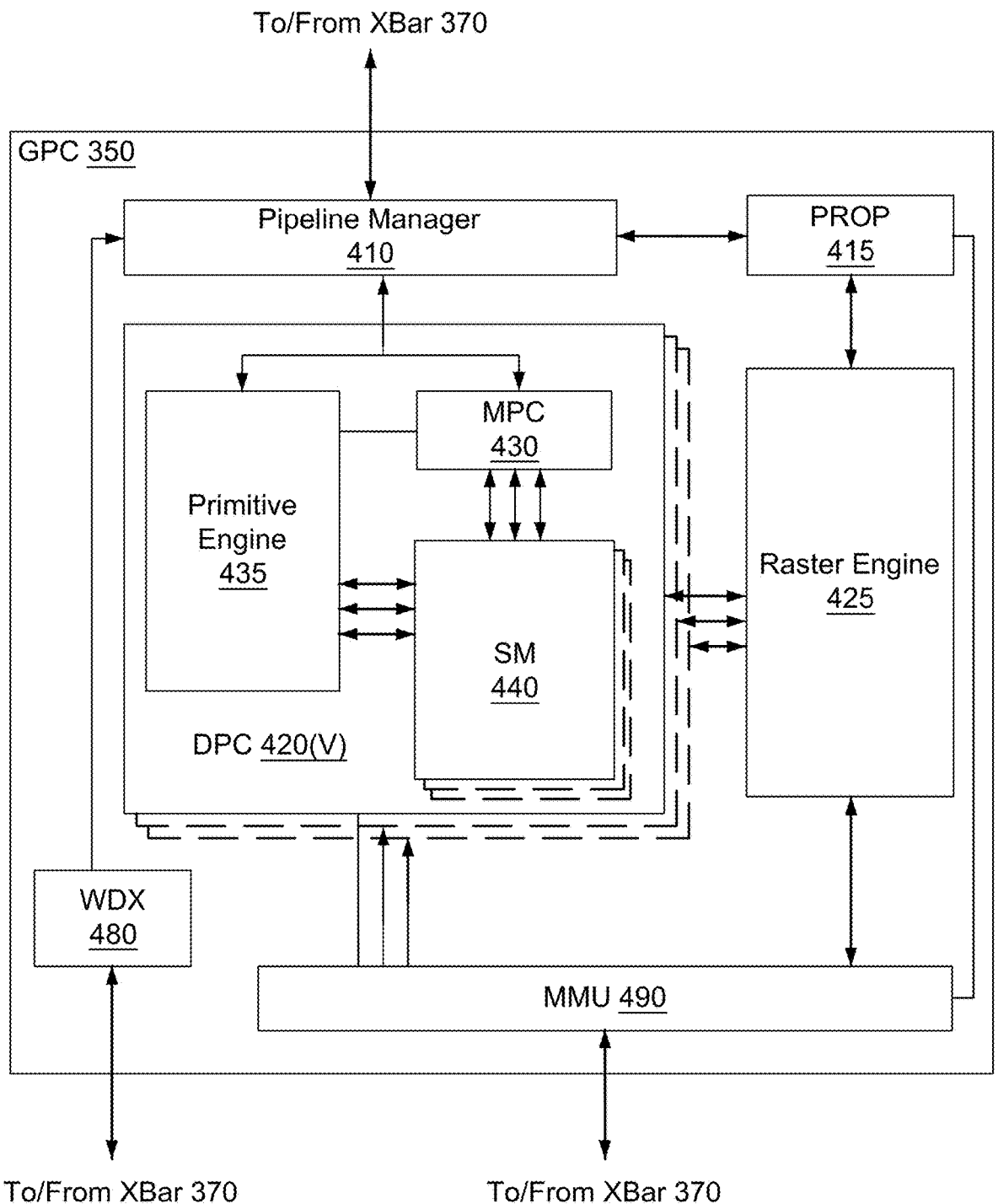
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
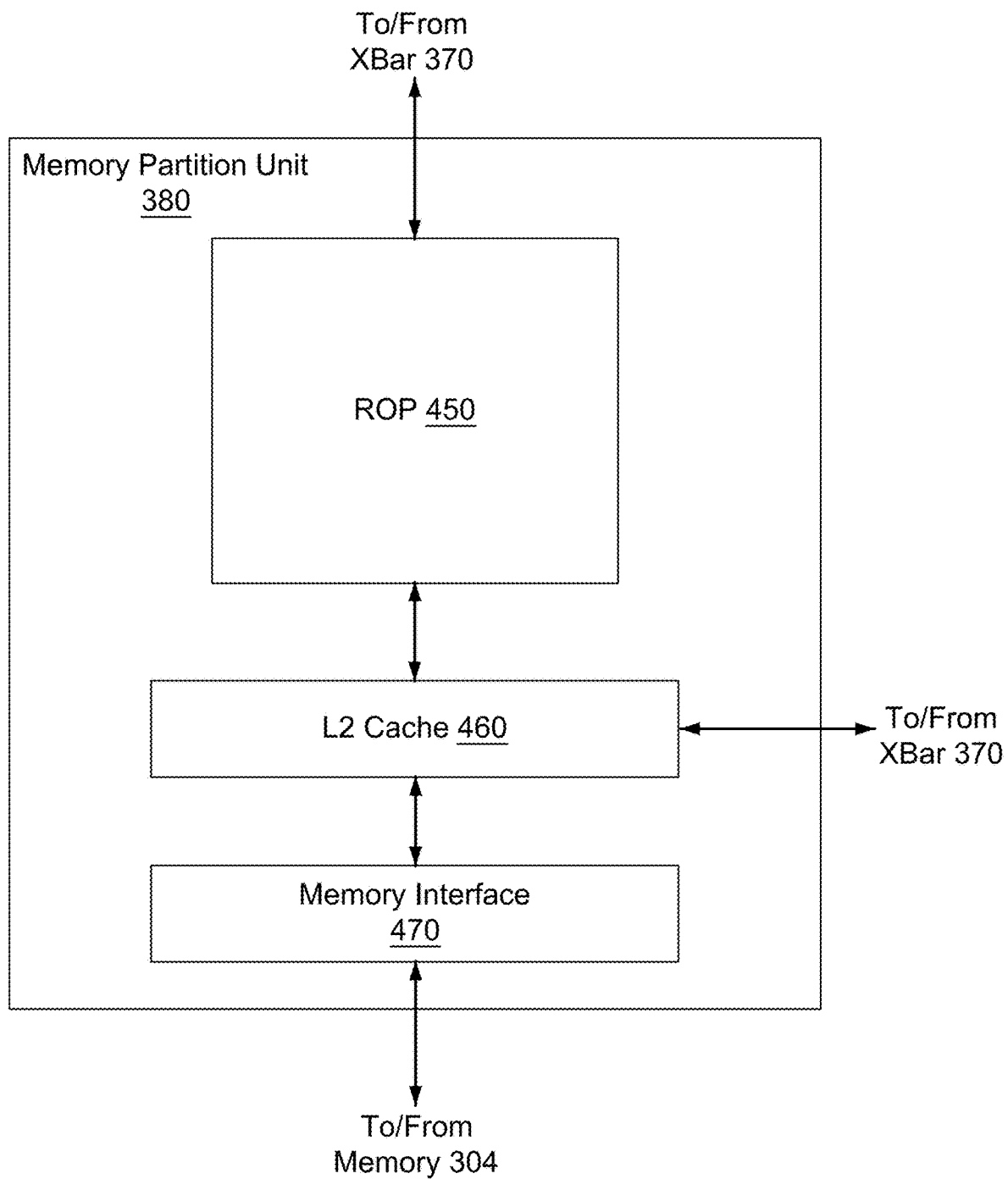
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
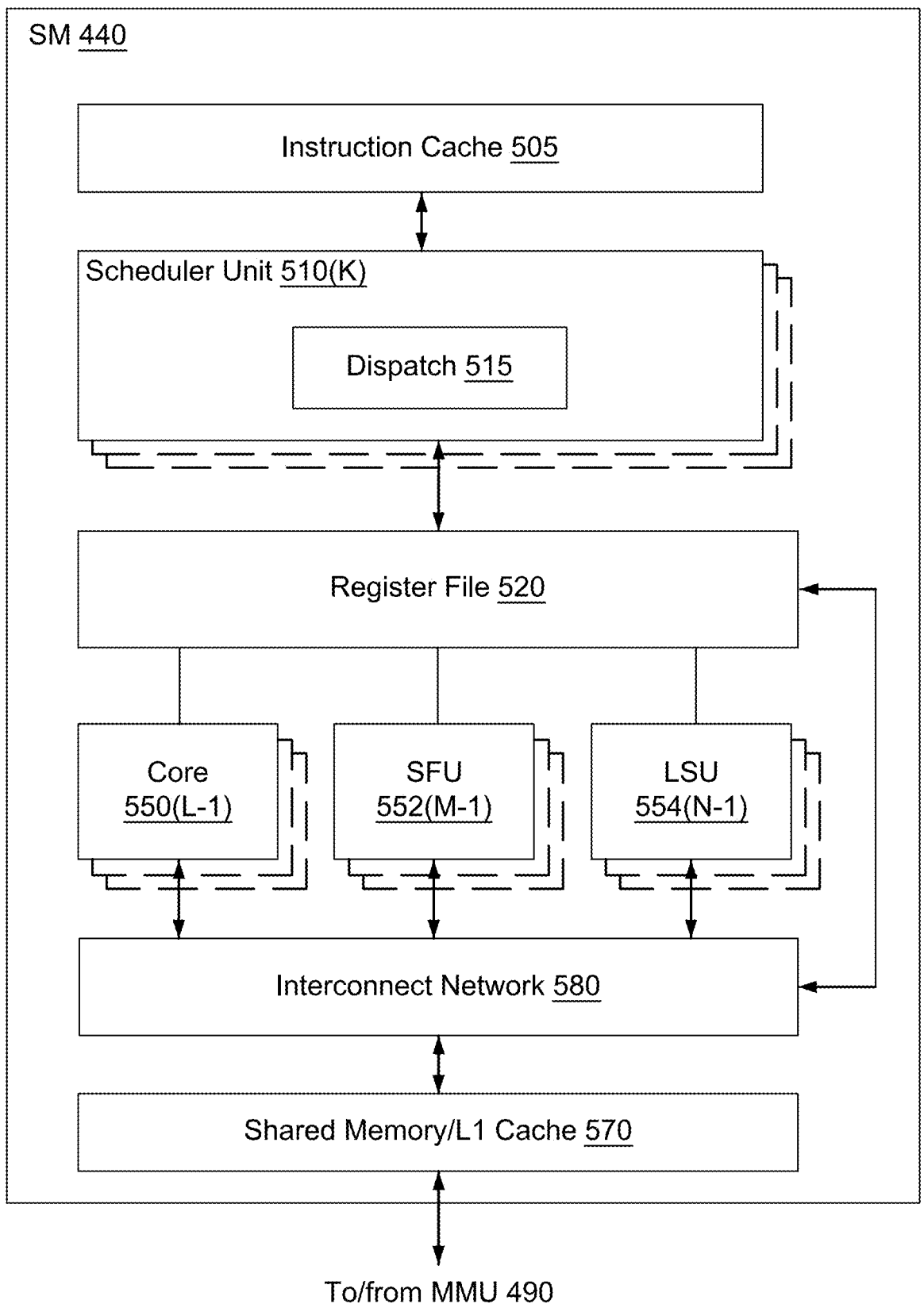
FIG. 5A illustrates the streaming multiprocessor of FIG. 4A, in accordance with an embodiment.

FIG. 5A illustrates the streaming multiprocessor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Figure 5B:
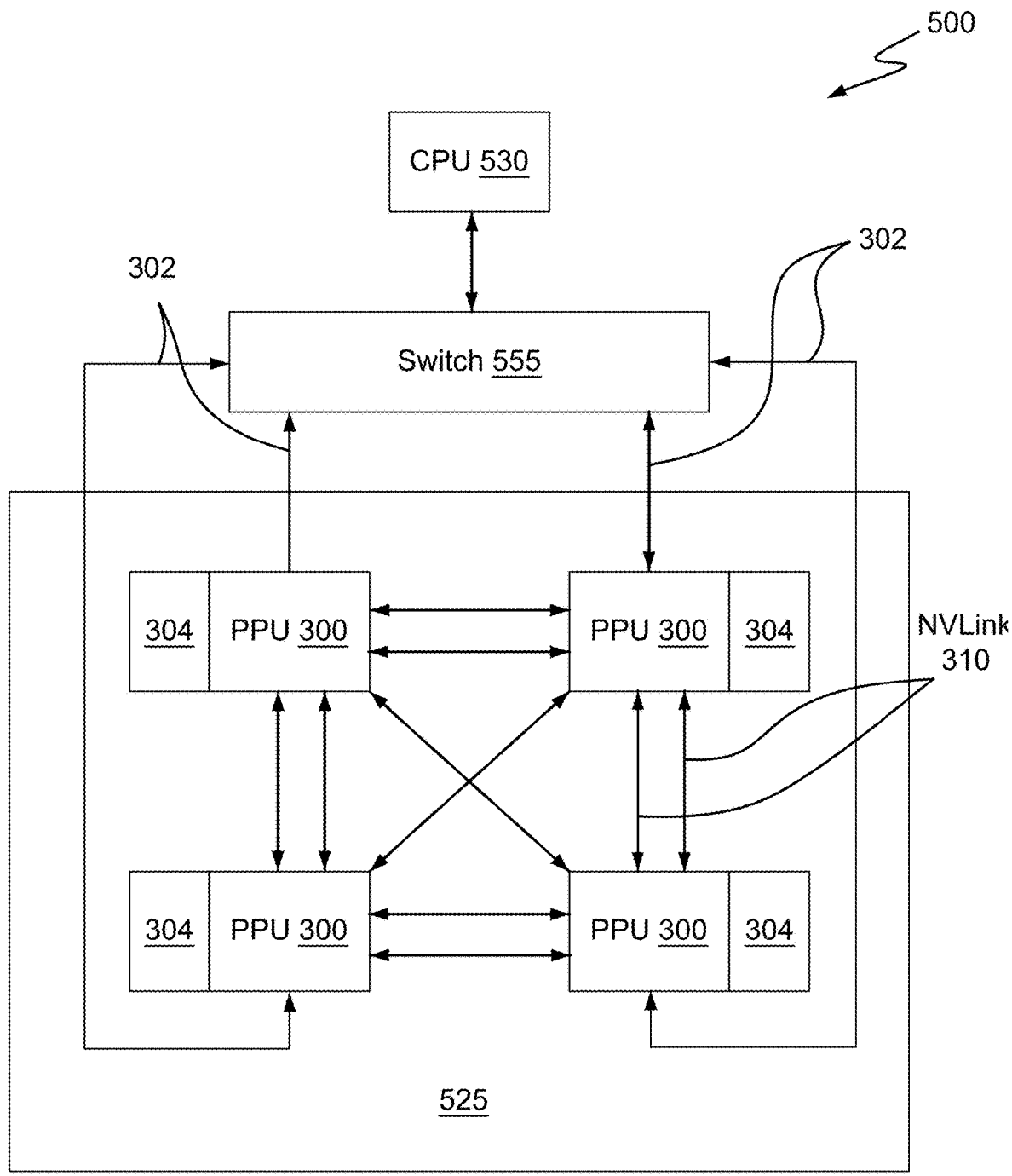
FIG. 5B is a conceptual diagram of a processing system implemented using the parallel processing unit (PPU) of FIG. 3, in accordance with an embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 5B is a conceptual diagram of a processing system 500 implemented using the PPU 300 of FIG. 3, in accordance with an embodiment. The exemplary system 500 may be configured to implement the methods 100 and 120 shown in FIGS. 1A-1B and/or the architectures shown in FIGS. 1C-1D. The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
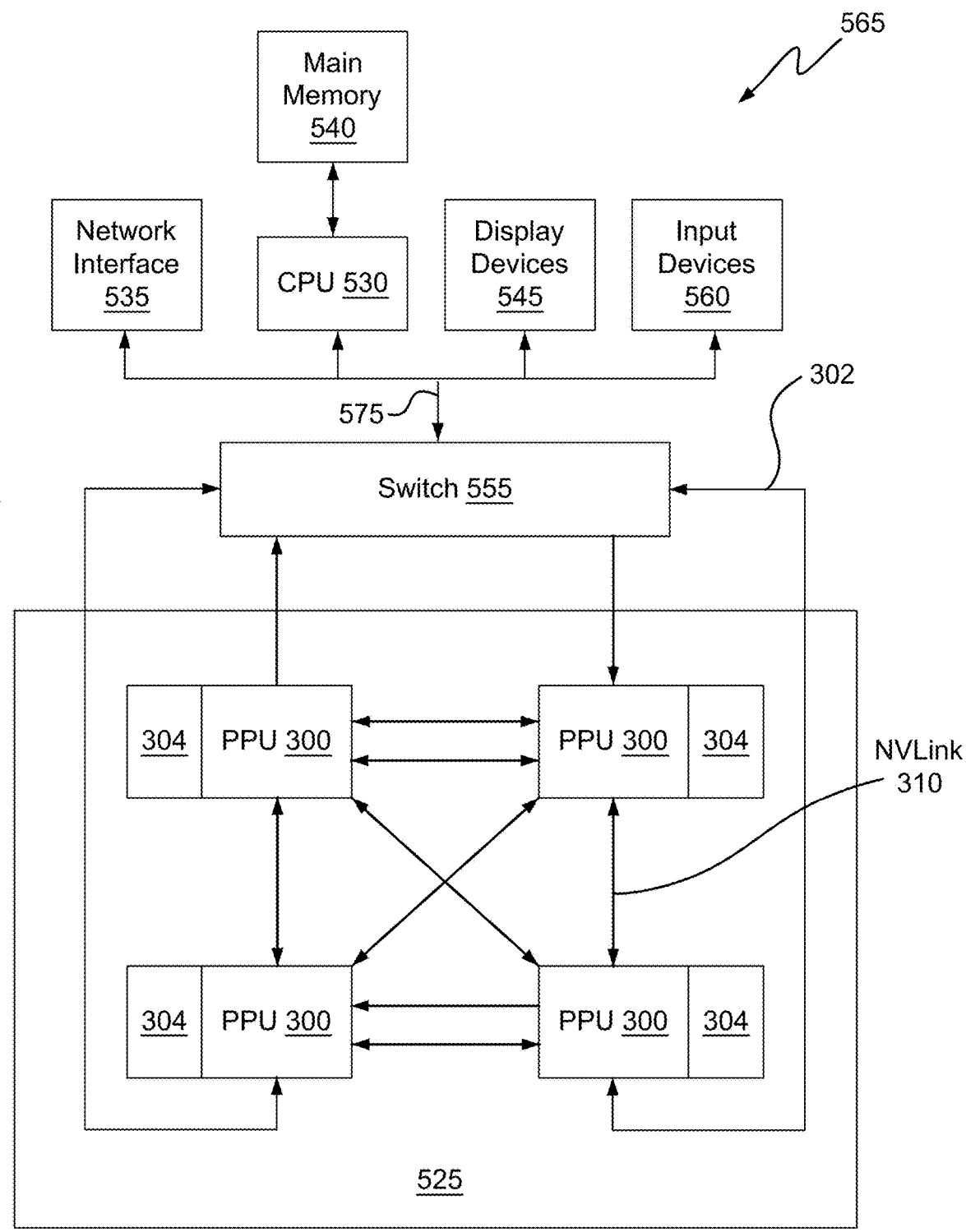
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 100 and 120 shown in FIGS. 1A-1B and/or the architectures shown in FIGS. 1C-1D.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
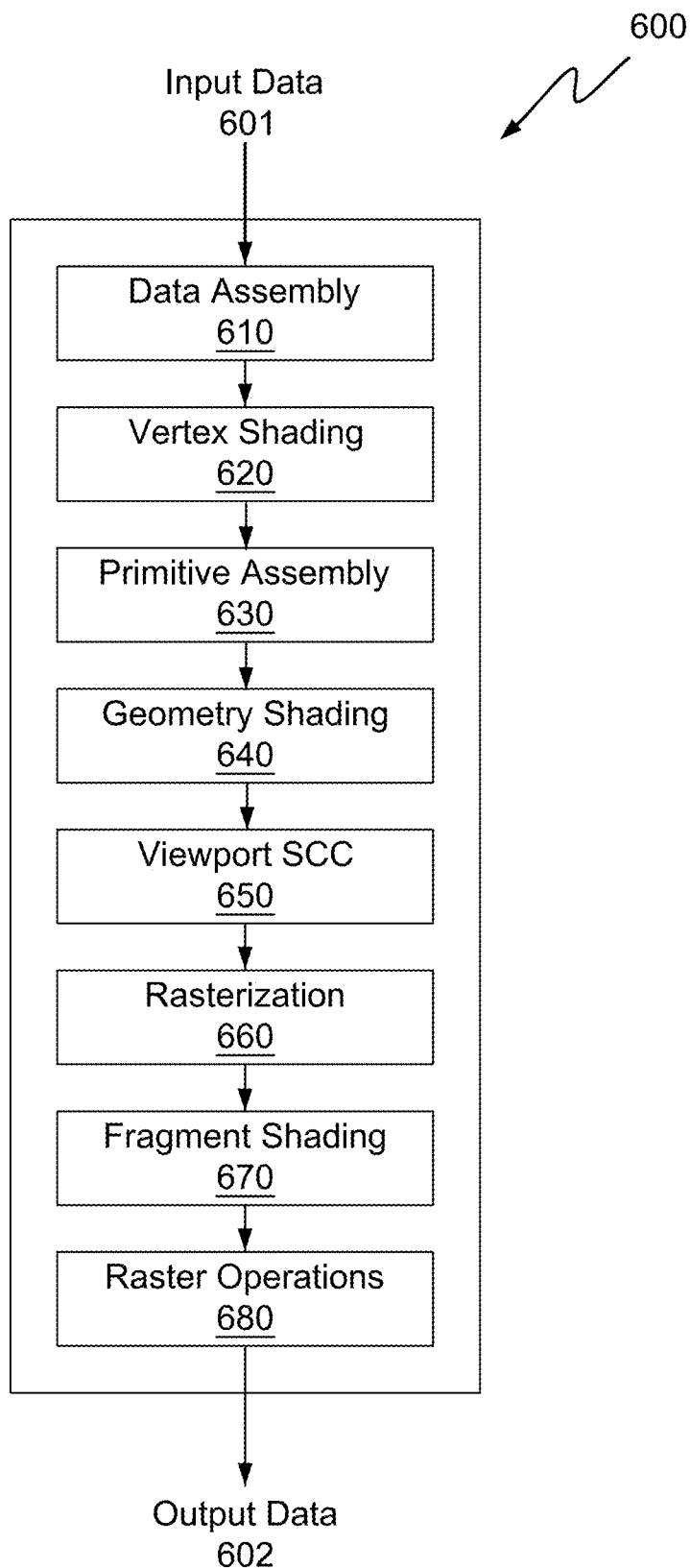
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Example Technical Advantages of Some Dynamic Jitter Tolerant Embodiments

The iterative network according to example embodiments is able to improve speed and accuracy of spatio-temporal action detection, which is an important component to surveillance, CV (computer vision), and ML/DL (machine learning/deep learning) applications. The example non-limiting technology herein can also add action detection capability as a feature to intelligent video analytics (IVA) products offering for video and surveillance OEMs (original equipment manufacturers). The example non-limiting technology has uses for example in intelligent video analytics (IVA) platforms and products for surveillance, advanced driver assistances systems (ADAS) products for co-pilot and automotive systems, optimized CV/ML/DL (computer vision, machine learning, deep learning) libraries, and many other applications.

Example non-limiting embodiments can also be used in: HPC/workstation/desktop GPUs as the processors of choice for rapidly training and prototyping CV/ML/DL algorithms; and Jetson embedded platforms (see https://developer.nvidia.com/embedded/meet-jetson-embedded-platform) with CUDA capable GPUs as the processors of choice for implementing and inferring of deep learning systems.

Many of the examples described above involved human action detection. However, embodiments are not limited to human action detection, and may alternatively or additionally include actions of animals or certain objects.

Each patent and prior printed publication cited herein is expressly incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An iterative prediction method for a task of action detection in video, comprising:
processing an inputted sequence of video frames to generate an output of both action tubes and respective action classification labels, wherein each said action tube comprises a bounding box on respective video frames in a sequence of video frames,
wherein the processing comprises iteratively processing, based on the inputted sequence of video frames that is incrementally expanded in successive iterations by adding a first video clip preceding the inputted sequence of frames and a second video clip succeeding the inputted sequence of frames, offsets between the bounding boxes and ground-truth on the respective video frames,
wherein, in each of said iterations, each anchor in a set of anchors inputted corresponds to a position of a respective action tube from the set of action tubes generated in an immediately preceding iteration.

2. The iterative prediction method according to claim 1, wherein the processing further comprises processing the inputted sequence of video frames to generate a set of action tubes based on action tubes generated in a previous iteration of said iterative processing.

3. The method according to claim 1, wherein the incrementally expanded inputted sequence of video frames consists of consecutive frames from a video stream.

4. The iterative prediction method according to claim 1, wherein said first and second video clips each having twenty or less video frames.

5. The method according to claim 1, wherein the position of the respective action tube is determined in a video frame latest in time in video clips processed in the immediately preceding iteration.

6. The method according to claim 1, wherein the inputted sequence of video frames is a short video clip comprising less than all video frames of the video stream.

7. The method according to claim 6, wherein the inputted sequence of video frames includes less than 10 video frames.

8. The method according to claim 1, wherein said each video clip consists of a same number of video frames.

9. The method according to claim 1, further comprising determining the set of anchors used in the first iteration from configuration information.

10. The method according to claim 9, wherein the set of anchors used in the first iteration overlays an entire frame.

11. The method according to claim 10, wherein one of the set of anchors used in the first iteration overlays an entire frame.

12. An iterative prediction system configured to perform a task of action detection in video, comprising:
- a video processor configured to process an inputted sequence of video frames to generate an output of both action tubes and respective action classification labels, wherein each said action tube comprises a bounding box on respective video frames in a sequence of video frames,
- wherein the video processor comprises an iterative predictor that processes, based on the inputted sequence of video frames that is incrementally expanded in successive iterations by adding a first video clip preceding the inputted sequence of frames and a second video clip succeeding the inputted sequence of frames, offsets between the bounding boxes and ground-truth on the respective video frames,
- wherein, in each of said iterations, each anchor in a set of anchors inputted corresponds to a position of a respective action tube from the set of action tubes generated in an immediately preceding iteration.

13. The iterative prediction system according to claim 12, wherein the incrementally expanded inputted sequence of video frames consists of consecutive frames from a video stream.

14. The iterative prediction system according to claim 12, wherein the iterative predictor determines the position of the respective action tube in a video frame latest in time in video clips processed in the immediately preceding iteration.

15. The iterative prediction system according to claim 12, wherein the iterative predictor further determines the set of anchors used in the first iteration from configuration information.

16. The iterative prediction system according to claim 15, wherein the set of anchors used in the first iteration overlays an entire frame.

17. The iterative prediction system according to claim 16, wherein one of the set of anchors used in the first iteration overlays an entire frame.

* * * * *